United States Patent [19]

Huang

[11] Patent Number: 5,232,304
[45] Date of Patent: Aug. 3, 1993

[54] CONNECTOR FOR HOLLOW PIPES

[76] Inventor: Te-hsien Huang, No. 17, Lane 20, Shou Chang Street, Taoyuan, Taiwan

[21] Appl. No.: 945,090

[22] Filed: Sep. 15, 1992

[51] Int. Cl.⁵ .............................................. F16B 1/00
[52] U.S. Cl. .................................. 403/374; 403/409.1
[58] Field of Search .................. 403/297, 374, 409.1, 403/104; 248/411, 412

[56] References Cited

U.S. PATENT DOCUMENTS

| | | | |
|---|---|---|---|
| 1,994,303 | 3/1935 | Clark | 403/104 X |
| 2,308,542 | 1/1943 | Raybould | 403/297 |
| 2,508,039 | 5/1950 | Neuwirth | 248/188.5 |
| 2,542,967 | 2/1951 | Waechter | 248/188.5 |
| 2,850,308 | 9/1958 | Le Febvre et al. | 403/104 |
| 4,294,560 | 10/1981 | Larkin | 248/411 X |

Primary Examiner—Randolph A. Reese
Assistant Examiner—Anthony Knight
Attorney, Agent, or Firm—Bacon & Thomas

[57] ABSTRACT

A connector structure for hollow pipes comprises a connecting rod, a side stop, a connecting block, and a slidable fixing block, in which the connecting block has a first pipe connecting element, an intermediate flange and a second pipe connecting element with a slope on an outer side; the slidable fixing block is placed within a pipe and has a slope opposite the slope of the connecting block. Such a structure can connect two pipes by passing the connecting rod through the side stop, the first pipe and the connecting block, having its threaded section fixed to the threaded hole of the slidable fixing block, and then turning the connecting rod.

3 Claims, 4 Drawing Sheets

CONNECTOR FOR HOLLOW PIPES

BACKGROUND OF THE INVENTION

1. Field of the Invention

The present invention relates to a connector structure for hollow pipes, which is particularly effective for connecting non-cylindrical pipes in addition to its use for connection of cylindrical pipes.

The present invention is for connection of two pipes within the hollow spaces of these pipes, rather than at the outer sides of these pipes.

2. Description of the Prior Art

Generally, an outer thread at an end of a cylindrical pipe, and an inner thread at an end of another cylindrical pipe are required for connection of two cylindrical pipes. Such a structure is not applicable for connection of non-cylindrical pipes. For connection of such pipes, a connecting means is used to connect two adjacent ends of these pipes. Such conventional connecting means cannot provide a tight connection, and the connection and separation of the pipes are not easy. Hence, if connection is required, cylindrical pipes are preferred.

SUMMARY OF THE INVENTION

Disclosed herein is a connector structure for hollow pipes which comprises a connecting rod, a side stop, a connecting block, and a slidable fixing block, in which the connecting block has a first pipe connecting element, an intermediate flange and a second pipe connecting element with a slope on an outer side; the slidable fixing block is placed within a pipe and has a slope opposite adjacent to the connecting block. Such a structure can connect two pipes by passing the connecting rod through the side stop, the first pipe and the connecting block, engaging its threaded section to the threaded hole of the slidable fixing block, and then turning the connecting rod.

Hence, the main object of the present invention is to provide a connector structure for the internal connection of non-cylindrical pipes.

Another object of the present invention is to provide a connector structure which can maintain connection of two hollow pipes in a tightly connected condition.

Another object of the present invention is to provide a connector structure which permits easy and fast connection and disconnection of hollow pipes.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
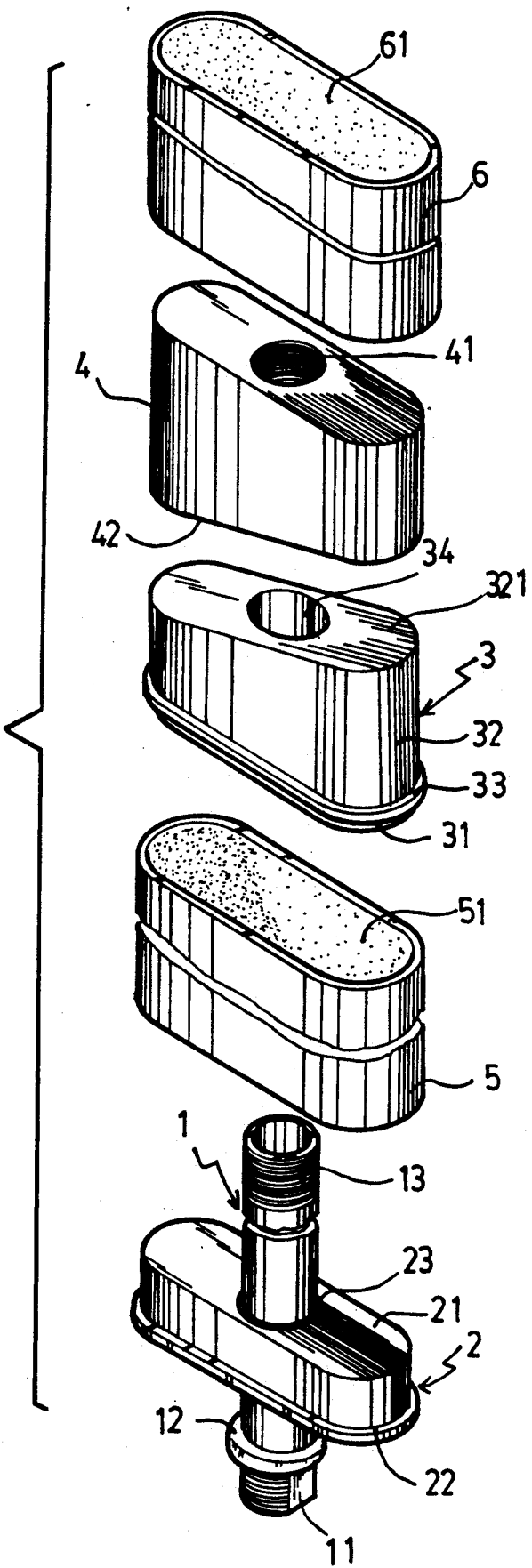
FIG. 1 is an exploded perspective view of a connector structure according to the present invention and fragments of two hollow pipes.

Please refer to FIG. 1, the present invention comprises mainly a connecting rod (1), a side stop (2), a connecting block (3) and a slidable fixing block (4). The connecting rod (1) has an extension (11) with a stop flange (12) at one end, and a threaded section (13) at the other end. The side stop (2) is composed of a body (21) and a stop or end flange (22), and has a passing hole (23) for passing through of the connecting rod (1). The connecting block (3) is composed of a first pipe connecting element (31), an intermediate flange (33) and a second pipe connecting element (32), and has an axial hole (34) for passing through of the connecting rod (1). The second pipe connecting element (32) has an angled face or slope (321) at an outer side. The slidable fixing block (4) has an axial threaded hole (41) and an angled face or slope (42) corresponding to the slope (321) on the second connecting element (32). Angled faces (321) and (42) are angularly disposed relative to the longitudinal axis of connecting rod (1). A pipe (5) is placed between the side stop (2) and the connecting block (3), another pipe (6) is placed on the slidable fixing block (4). These two pipes (5 and 6) are then connected by the components described above.

Figure 2:
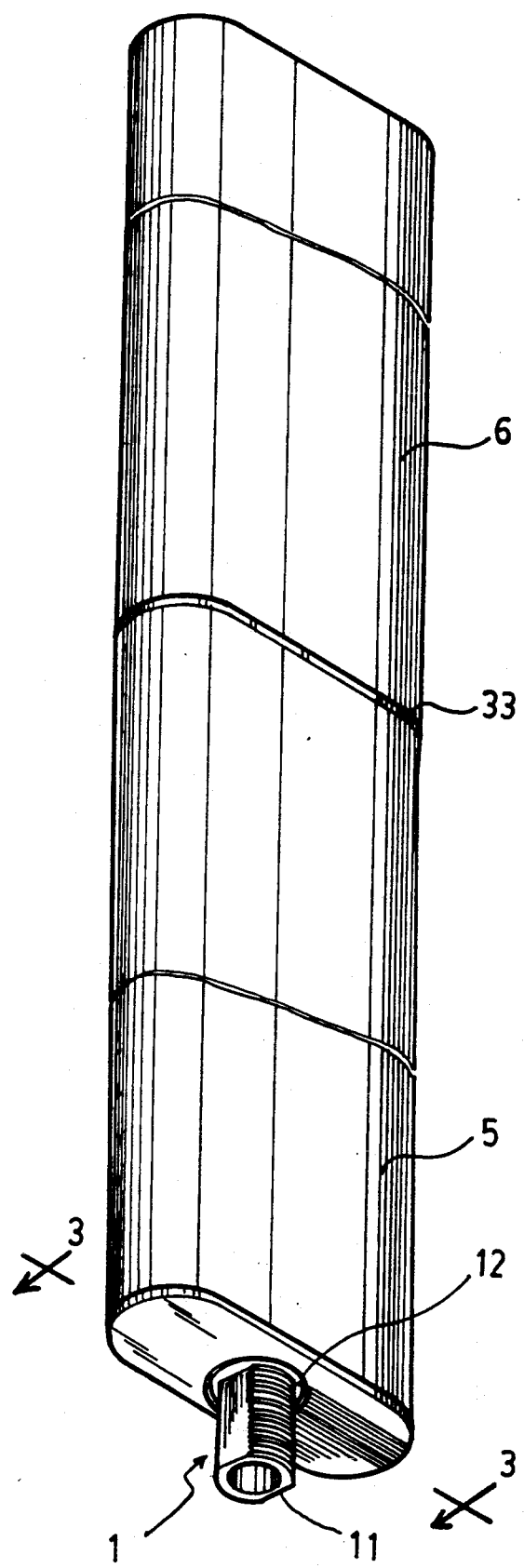
FIG. 2 is a perspective view illustrating connection of two hollow pipes with the connector structure according to the present invention.
Figure 3:
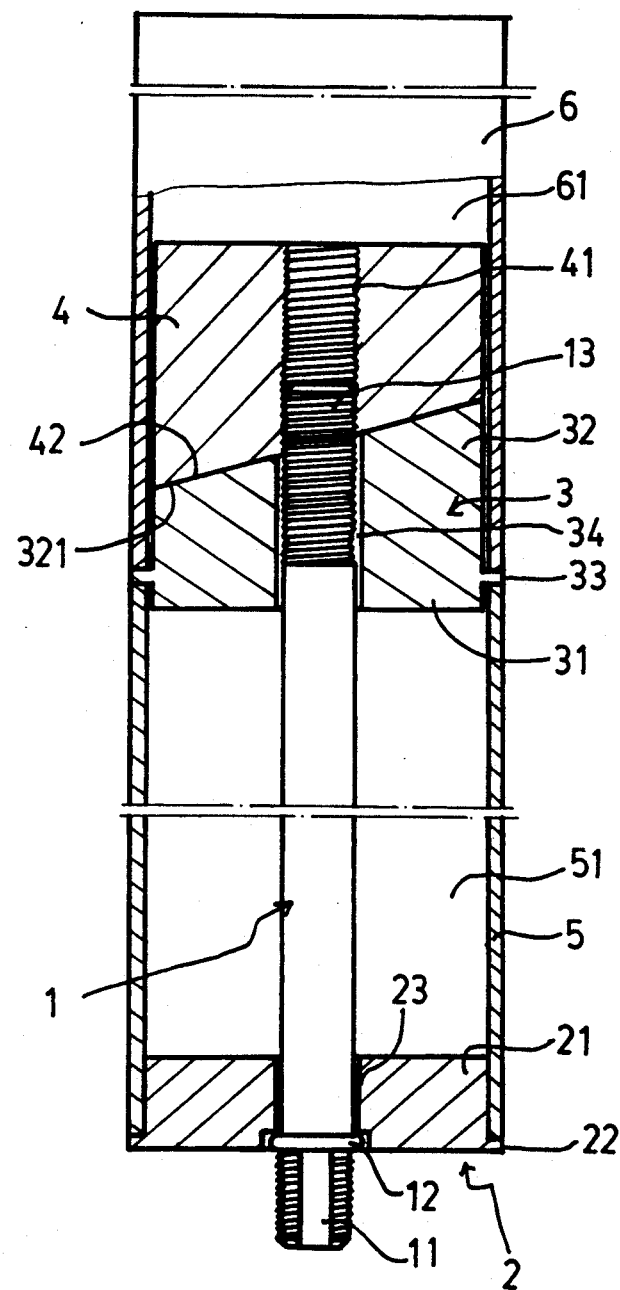
FIG. 3 is a longitudinal cross-sectional view taken along the direction of line 3—3 in FIG. 2.

Please refer to FIGS. 2 and 3, the body (21) of the side stop (2) has a shape and a dimension corresponding to the hollow hole or interior (51) of the pipe (5) for placing it within the hollow hole (51). The stop flange (22) is slightly greater than the diameter of the hollow hole (51) to prevent its inward displacement. The stop flange (12) and the extension (11) are kept out of the passing hole (23) when the connecting rod (1) is passed through the passing hole (23) for positioning of the connecting rod (1) and the side stop (2).

The first pipe connecting element (31) of the connecting block (3) has a shape and a dimension corresponding to the hollow hole (51) of the pipe (5). It can be placed within an end of the pipe (5) and retained thereto by the intermediate flange (33) which is slightly greater than the diameter of the hollow hole (51) of the pipe (5) and the diameter of the hollow hole (61) of the pipe (6). The second pipe connecting element (32) of the connecting block (3) and the slidable fixing block (4) are designed corresponding to the hollow hole (61) of the pipe (6) in shape and dimension so that they can be tightly fitted within the hollow hole (61).

The connecting rod (1) is passed through the passing hole (23) of the side stop (2), the hollow hole (51) of the pipe (5), and the axial hole (34) of the connecting block (3), and then connected to the slidable fixing block (4) by engagement between the threaded section (13) and the threaded hole (41).

Figure 4:
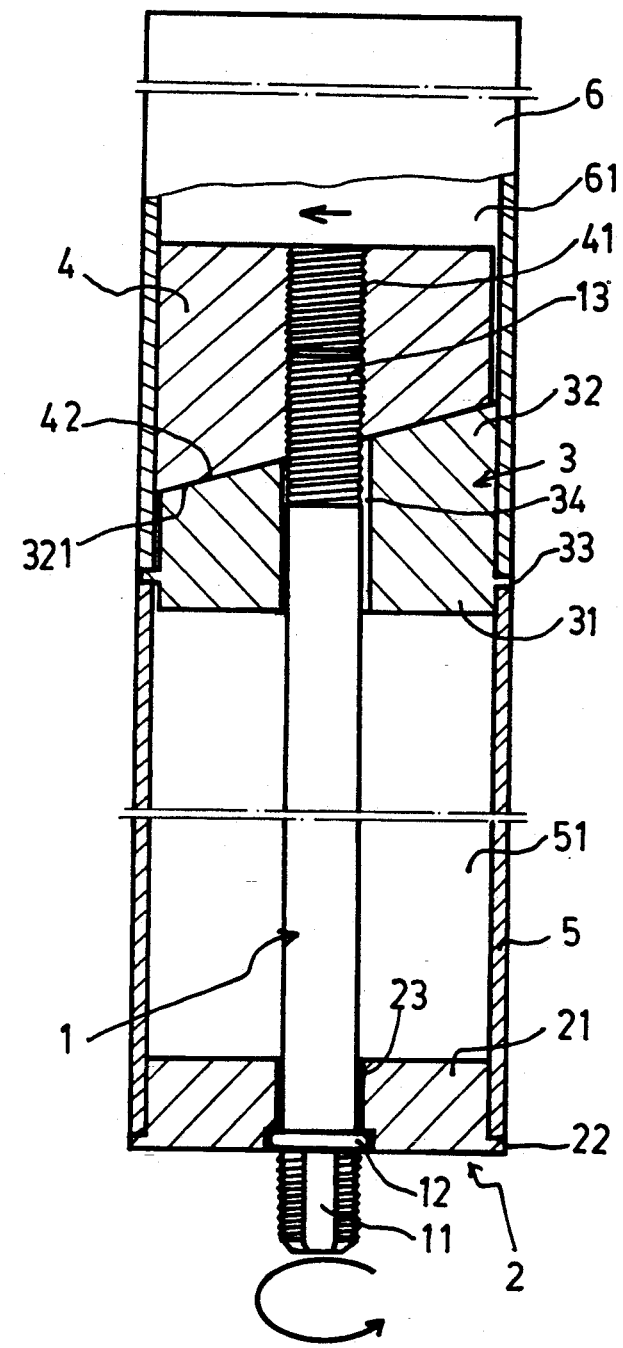
FIG. 4 is a sectional view as illustrated in FIG. 3 depicting the tightening operation for forming the connection.

Please refer to FIG. 4, when the extension (11) of the connecting rod (1) is turned with an appropriate tool so that the slidable fixing block (4) is displaced toward the pipe (5), the slidable fixing block (4) and the connecting block (3) are slid sideward or transversely because of mutual squeezing of the two slopes (321) which can consequently keep close contact with the inner wall of the pipe (6) so that the pipe (6) can be tightly fitted to the connecting block (3) and the slidable fixing block (4). On the other hand, as the connecting rod (1) has its stop flange (12) retained at the side stop (2), there is a good connection between the pipe (5) and the pipe (6) by action of the connecting block (3). Whenever the connection becomes loose due to vibration or other cause, a further turning of the connecting rod (1) can tighten the connection. If the connecting rod (1) is turned in reverse, the slidable fixing block (4) and the connecting block (3) are disengaged from the inner wall of the pipe (6) and hence the pipe (5) is separated from the pipe (6).

Please refer in FIGS. 1, 3 and 4, the axial hole (34) of the connecting block (3) is slightly enlarged to the displacing direction of the slope of the second pipe connecting element (32) so that there is a space for displacement of the connecting rod (1) when it is driven by the slidable fixing block (4), and to avoid blocking the sliding of the slidable fixing block (4) by tight engagement of the connecting rod (1) to the hole (34).

What is claimed is:

1. A connector for hollow pipes comprising: 'a) a connecting rod including first and second ends, a stop flange at the first end and a threaded section at the second end;
   b) a slide stop including a body dimensioned for insertion within a first end of a first pipe and a stop flange for engaging an end edge of the first pipe for limiting the insertion of the body therein;
   c) a connecting block including an axial hole for passing the connecting rod therethrough, a first pipe connecting element for insertion within a second end of the first pipe, a second pipe connecting element for insertion within an end of a second pipe, an intermediate flange for disposition between the first and second pipe connecting elements, and a first slope face angularly disposed relative to the longitudinal axis of the axial hole;
   d) a fixing block for insertion within the second pipe and including a threaded hole therethrough for engagement by the threaded end of the connecting rod and a second slope face angularly disposed relative to the longitudinal axis of the threaded hole for complementary engagement against the first slope face; and
   e) wherein threaded engagement of the connecting rod with the fixing block causes the fixing block to be drawn towards the slide stop and displaces the fixing block and connecting block transversely against interior wall portions of the first and second pipes for securely connecting the pipes together.

2. The connector of claim 1 wherein the second pipe connecting element of the connecting block and the fixing block are correspondingly configured in shape and dimension for tightly engaging the interior of the second pipe.

3. The connector of claim 1 wherein the axial hole of the connecting block is enlarged in the transverse displacement direction of the second pipe connecting element to define a space for displacement of the connecting rod during threaded engagement of the connecting rod with the fixing block.

* * * * *